US008144652B2

United States Patent
Iwamura

(10) Patent No.: US 8,144,652 B2
(45) Date of Patent: *Mar. 27, 2012

(54) SYSTEM AND METHOD FOR MULTI-LINK COMMUNICATION IN HOME NETWORK

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/980,926

(22) Filed: Dec. 29, 2010

(65) Prior Publication Data

US 2011/0093616 A1 Apr. 21, 2011

Related U.S. Application Data

(63) Continuation of application No. 10/790,496, filed on Mar. 1, 2004, now Pat. No. 7,965,673.

(60) Provisional application No. 60/501,625, filed on Sep. 9, 2003.

(51) Int. Cl.
*H04W 4/00* (2009.01)

(52) U.S. Cl. ........ 370/328; 370/419; 370/401; 709/220; 725/81

(58) Field of Classification Search ........................ None
See application file for complete search history.

(56) References Cited

U.S. PATENT DOCUMENTS

| | | | |
|---|---|---|---|
| 6,363,434 B1 * | 3/2002 | Eytchison | 719/313 |
| 6,907,301 B2 * | 6/2005 | Kou et al. | 700/19 |
| 2002/0078293 A1 * | 6/2002 | Kou et al. | 710/305 |
| 2003/0101459 A1 * | 5/2003 | Edson | 725/82 |
| 2003/0140343 A1 * | 7/2003 | Falvo et al. | 725/51 |
| 2004/0125777 A1 * | 7/2004 | Doyle et al. | 370/338 |
| 2004/0165586 A1 * | 8/2004 | Read et al. | 370/389 |
| 2005/0015806 A1 * | 1/2005 | Patel | 725/81 |

* cited by examiner

*Primary Examiner* — Bob Phunkulh
(74) *Attorney, Agent, or Firm* — John L. Rogitz

(57) ABSTRACT

A client in a home entertainment network can communicate with other components, including the server, over both a wired and a wireless link, with the particular path being selected based a component preference, and/or a bandwidth capability, and/or an occupancy ratio. Both links may be simultaneously used.

25 Claims, 5 Drawing Sheets

Power Line Network and Wireless Network (1)

Server

Client

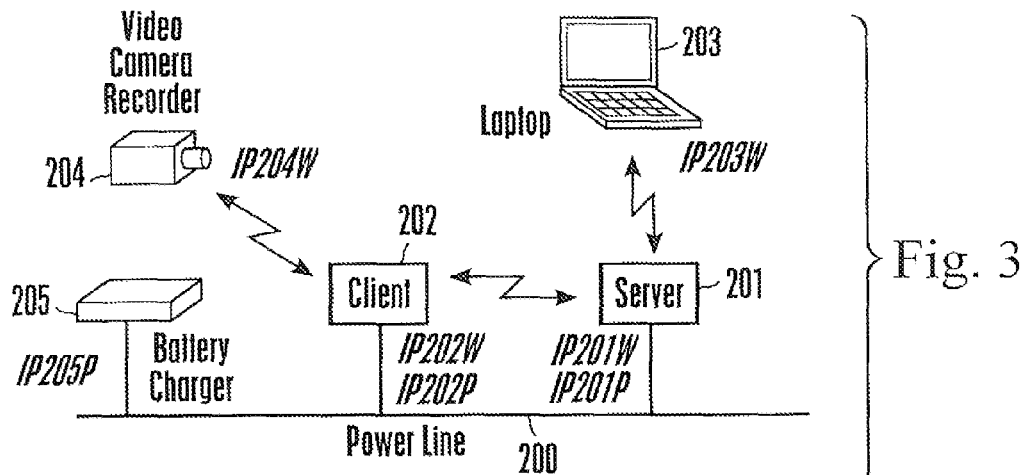
Fig. 3 — Power Line Network and Wireless Network (1)
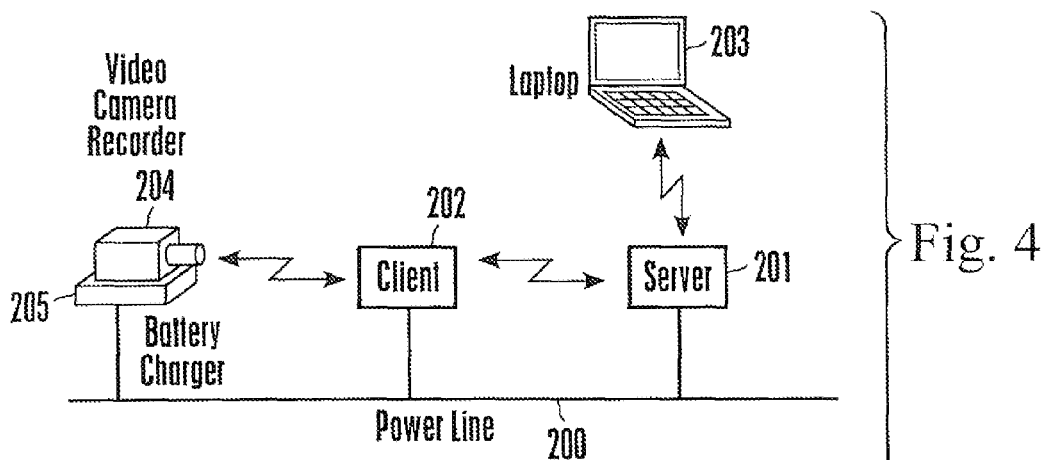
Fig. 4 — Power Line Network and Wireless Network (2)
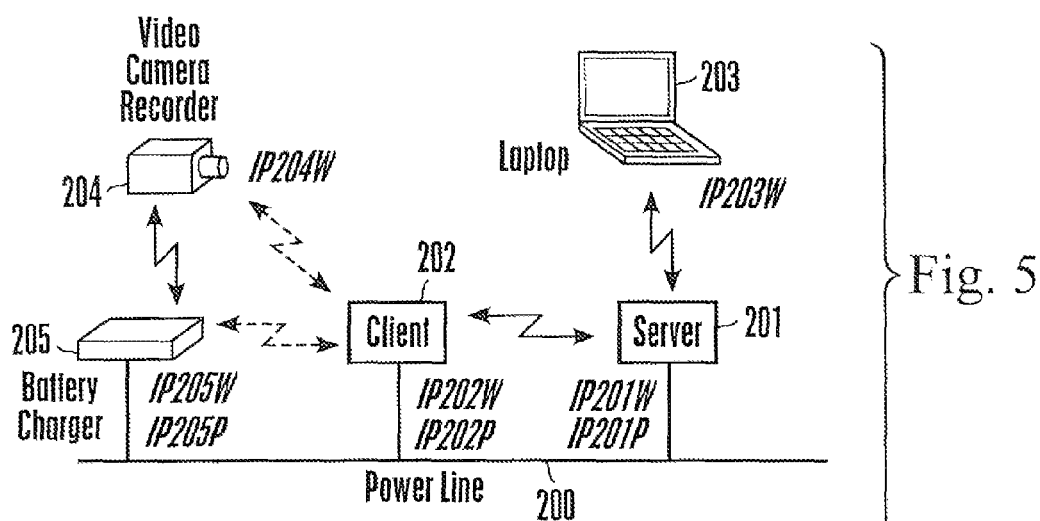
Fig. 5 — Power Line Network and Wireless Network (3)

Software Algorithm (1)

Software Algorithm (2)

SYSTEM AND METHOD FOR MULTI-LINK COMMUNICATION IN HOME NETWORK

RELATED APPLICATIONS

This application is a continuation of and claims priority from U.S. patent application Ser. No. 10/790,496, filed Mar. 1, 2004, now U.S. Pat. No. 7,965,673, which in turn claims priority from U.S. provisional patent application Ser. No. 60/501,625, filed Sep. 9, 2003, from which priority is presently claimed.

BACKGROUND OF THE INVENTION

1. Field of the Invention

The present invention relates generally to home entertainment systems.

2. Description of the Related Art

Home entertainment systems have been provided that can include a set-top box media server that communicates with various components in the home, e.g., TVs, laptop computers, and custom display devices. Home network communication technologies (e.g., 802.11 wireless, UWB (Ultra Wide Band), PLC (Power Line Communication), etc.) are widely used as their costs decrease. As critically recognized herein, it may be possible to provide a network component that can have two or more different network interfaces. For example, a digital TV set might have both an 802.11 wireless communication system and a power line (wired) communication system with which to communicate with a server. As also recognized herein, when both of a transmitter and a receiver have both a wired and a wireless communication system, it must be decided which system (or both) to use. It is to this problem that the present invention is directed.

SUMMARY OF THE INVENTION

A home entertainment system includes a server configured for both wired and wireless communication with components, and at least one component configured for communicating with the server along a wired path and also being configured for communicating with the server along a wireless path. At least one of: the server, and component, determines which path to use for communication based on at least one of: a component preference, a bandwidth capability, and an occupancy ratio.

Preferably, a respective address such as an IP address is associated with each path over which the component communicates. The component may be a television or a portable computer or other component.

In another aspect, a method for communicating in a home network includes determining that both a wired and a wireless path exist between the components, and determining whether at least one of the components prefers a particular path and if so, communicating data over that path. Otherwise, the method includes communicating data over at least one of the paths based on at least one of: a bandwidth capability, and an occupancy ratio.

In yet another aspect, a system for communicating between at least first and second components in a home network includes means for establishing a wired communication path between the components, and means for establishing a wireless communication path between the components. Means are provided for communicating data over a component-preferred path when a component-preferred path is indicated, with the component-preferred path being selected from the wired and wireless communication paths. Also, means are provided for, when no component-preferred path is indicated, communicating data over at least one of the paths based on at least one of: a bandwidth capability, and an occupancy ratio.

BRIEF DESCRIPTION OF THE DRAWINGS

The details of the present invention, both as to its structure and operation, can best be understood in reference to the accompanying drawings, in which like reference numerals refer to like parts, and in which:

FIG. 3 is a block diagram of a network according to the present invention;

FIG. 4 is another block diagram of the network;

FIG. 5 is yet another block diagram of the network; and

DETAILED DESCRIPTION OF THE PREFERRED EMBODIMENTS

In the preferred non-limiting embodiment shown, the processors described herein may access one or more software or hardware elements to undertake the present logic. The flow charts herein illustrate the structure of the logic modules of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer or microprocessor) to perform a sequence of function steps corresponding to those shown. Internal logic could be as simple as a state machine.

In other words, the present logic may be established as a computer program that is executed by a processor within, e.g., the present microprocessors/servers as a series of computer-executable instructions. In addition to residing on hard disk drives, these instructions may reside, for example, in RAM of the appropriate computer, or the instructions may be stored on magnetic tape, electronic read-only memory, or other appropriate data storage device.

Figure 1:
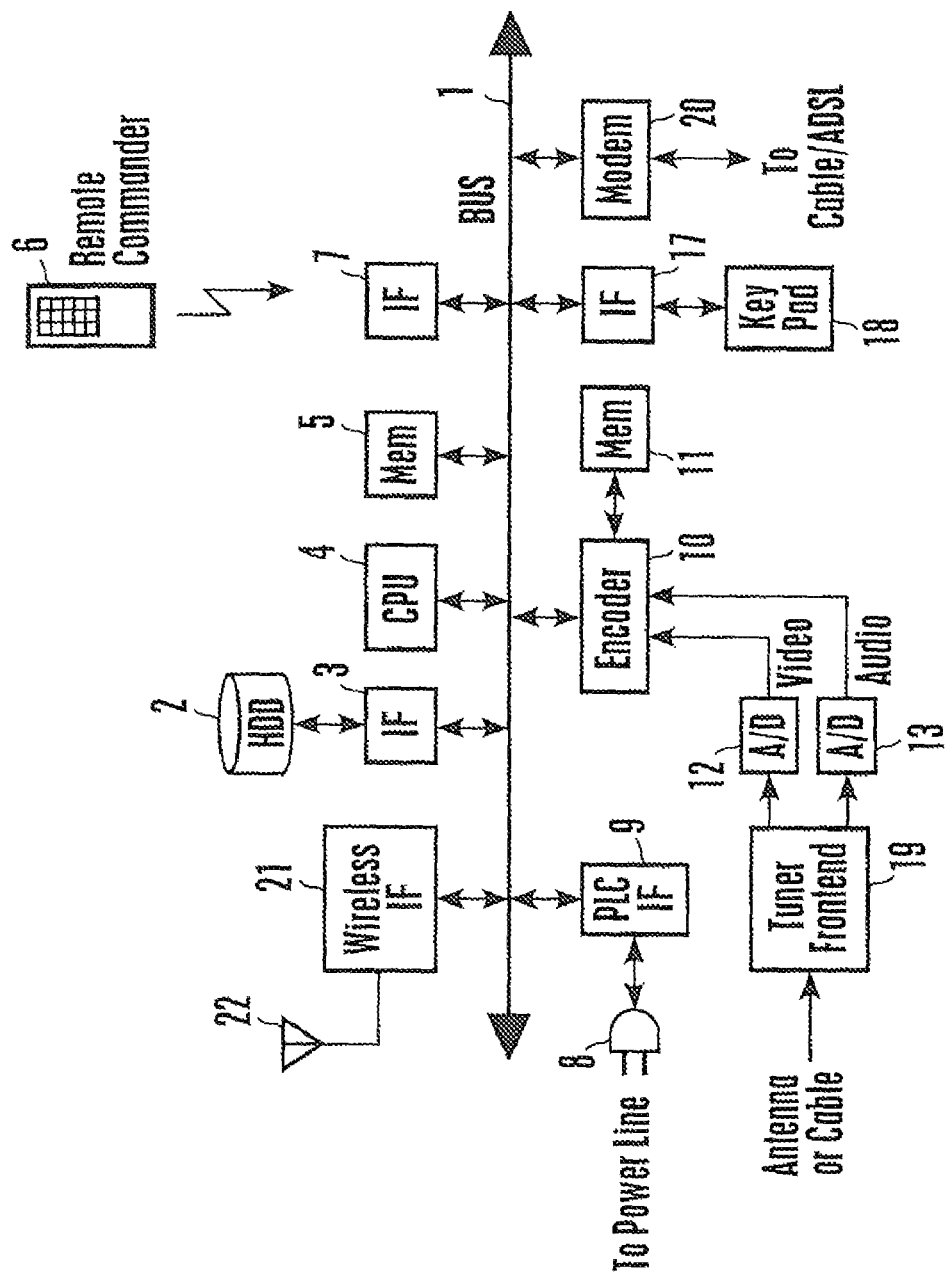
FIG. 1 is a block diagram of the server of the present invention.

FIG. 1 shows an example of a server 201. Tuner Frontend 19 receives a RF signal from an antenna or a cable network. An analog video output signal from Tuner Frontend 19 is Analog-Digital converted at A/D 12 and sent to Encoder 10. Similarly, an analog audio output is A/D converted at A/D 13 and sent to Encoder 10. Encoder encodes the input signal using Memory 11. The encoded signal is sent to Power Line Communication Interface 9 and/or Wireless Interface 21 through the internal bus 1. The encoded signal is also sent to HDD Interface 3 through Bus 1 and recorded to HDD 2 if necessary. A playback stream from HDD 2 is sent to PLC I/F 9 and/or Wireless I/F 21 through Bus 1.

The user inputs a command using Key Pad 18 or Remote Commander 6. Key Pad 18 sends a command to CPU 4 through Interface 17 and Bus 1. Similarly, Infrared Remote Commander 6 sends a command to CPU 4 through Interface 7 and Bus 1. Modem 20 is, for example, a cable or ADSL modem and connected to the Internet. CPU 4 controls each component in Server 201 (FIG. 3). Memory 5 stores a software program to run on CPU 4. Also, memory 5 has working spaces and temporary data storage for CPU 4.

PLC I/F 9 receives a stream from Encoder 10 or HDD 2 and sends it to the destination on the power line 200 (FIG. 3). Power Plug is 8 is plugged in the power line 200. Also, PLC I/F 9 receives a command from CPU 4 and sends to the destination. Data sent from a transmitter on the power line 200 is received by PLC I/F 9 and sent to an appropriate block, for example, CPU 4. Wireless I/F 21 works in a similar manner. Wireless I/F 21 receives data or a stream from Bus 1 and transmits from Antenna 22. Date received by Wireless I/F 21 is sent to an appropriate block, for example CPU 4. To send a stream or data to the destination, CPU 4 selects either network interface. Both networks are IP-based and each interface has a unique IP address. PLC I/F 9 and Wireless I/F 21 handle PHY (physical) and MAC (Media Access Control) layers. CPU 4 controls the upper layers, for example, TCP/IP and the application layers.

Figure 2:
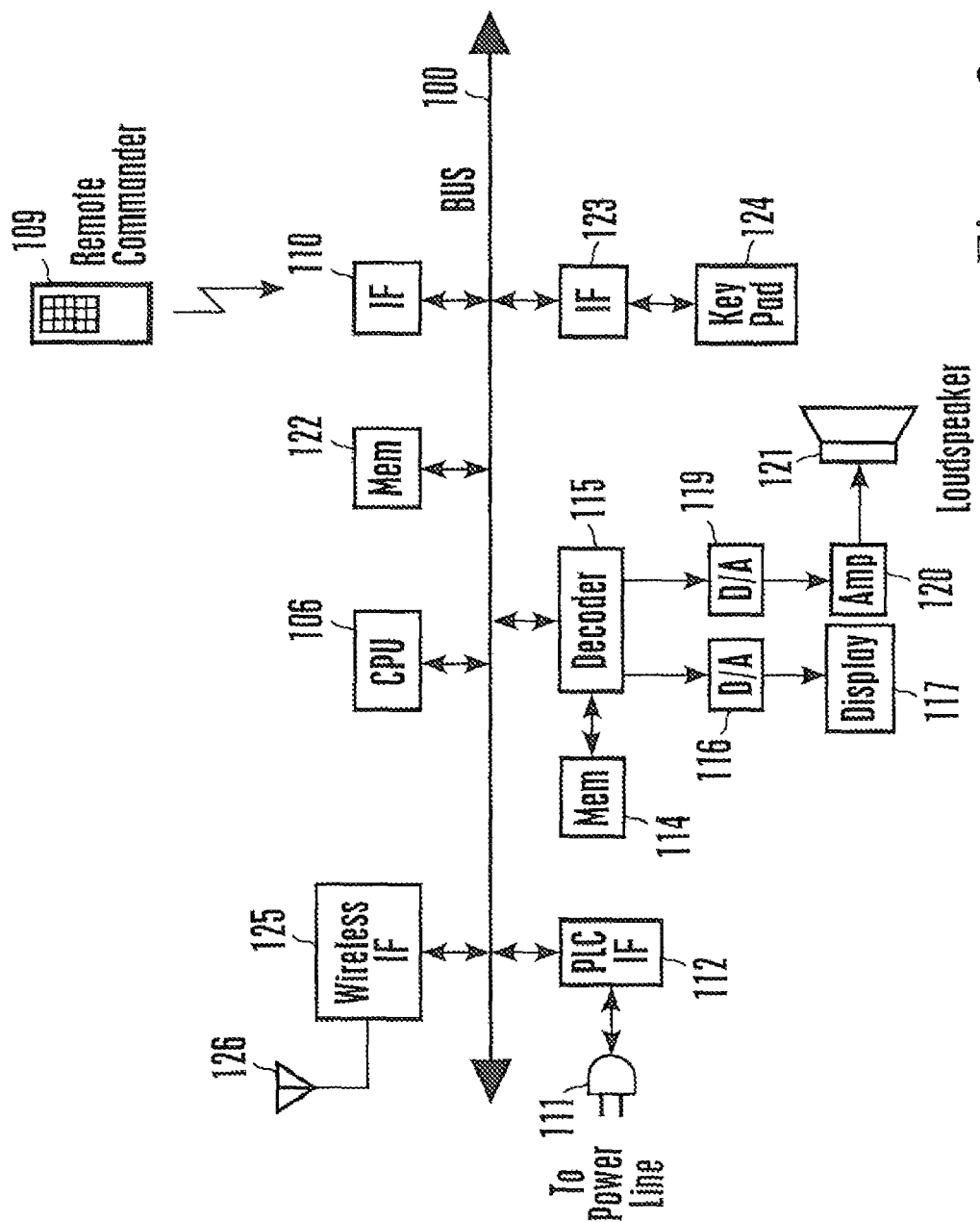
FIG. 2 is a block diagram of a client.

FIG. 2 shows an example of client 202 (FIG. 3). PLC I/F 112 and Wireless I/F 125 work in the same manner as PLC I/F 9 and Wireless I/F 21 in Server 201. An audio/video stream sent from Server 201 is received by either PLC I/F 112 or Wireless I/F 125 and sent to Decoder 115 through Bus 100. (If the data is not audio/video data, it may be sent to Memory 122 or CPU 106.) Decoder 115 decodes the stream using Memory 114. Decoded video signal is Digital-Analog converted in D/A 116 and displayed on Display 117. Decoded audio signal is D-A converted in D/A 119, amplified in Amp 120 and sent to Loudspeaker 121.

The user inputs a command using keypad 124 or remote commander 109. Keypad 124 sends a command to CPU 106 through interface 123 and bus 100. Similarly, Infrared remote commander 109 sends a command to CPU 106 through interface 110 and bus 100. CPU 106 controls each component in Client 202. Memory 122 stores a software program to run on CPU 106. Also, Memory 122 has working spaces and temporary data storage for CPU 106.

CPU 106 dynamically selects a stream source: either of PLC I/F 112 and Wireless I/F 125. A small time break may exist when the interface is switched. Some amount of the stream data is buffered in Memory 114. Even if such a break occurs, audio/video decoding by Decoder 115 does not stop.

FIG. 3 shows an example of multiple networks. Server 201, Client 202 and Battery charger 205 are on the power line network 200. Each of Server 201, Client 202, Laptop PC 203 and Video Camera Recorder 204 has a wireless network interface and they are on a wireless network.

Server 201 receives a broadcast signal from a cable network on an antenna and sends it to another device, for example, Client 202. Server 201 stores a broadcast program in an internal hard disk drive (HDD). A playback stream from the HDD is sent to another device to decode. Client 202 is a decoder/display. It receives an audio/video stream from Server 202, decodes and displays it on the display screen.

The power line network and the wireless network in this invention may be IP-based. Each device on the network has a unique IP address. A device with two network interfaces has two IP addresses. IP addresses are shown in italics in FIG. 3. A device number in the figure follows "IP". The last letter indicates power line (P) or wireless (W). For example, the IP address of the power line interface in Server 201 is "IP201P". Note that each network may have a different IP or IP-like address format. An important thing is all IP addresses must be unique.

A device with two network interfaces has two IP addresses. Another device does not know these two IP addresses are assigned to the same device. A transmitter and a receiver need to exchange IP address association information. In case of FIG. 3, Client 202 sends IP202W and IP202P to Server 201. Server 201 sends IP201W and IP201P to Client 202. Server 201 gets to know that Client 202 has two interfaces and both power line and wireless networks are available to communication with Client 202. Also, Client 202 gets the two IP addresses of Server 201.

Usually, Server 201 simultaneously transmits several streams to several destinations. Some device accepts only wireless access. Laptop 203 is an example. Another device, for example Battery Charger 205, has only power line interfaces. A transmission to these devices has no choice and either network is assigned. A transmission from Server 201 to Client 202 has two choices: power line or wireless. In this case, an appropriate network that has more available bandwidth will be selected, as discussed further below in reference to FIG. 6.

A transmission is categorized to one of the next types:
Type I: wireless only
Type II: power line only
Type III: wireless preferred
Type IV: power line preferred
Type V: wireless or power line When a transmitter and a receiver can communicate through both of the networks, one of Type III, IV or V is selected. Type III primarily selects wireless. Type IV primarily selects power line. Type V has no preference and selects either of them. For example, when the power line network has much larger bandwidth than the wireless network and a new transmission is an audio/video stream, which is a bandwidth eater, Type IV will be assigned to the transmission. In this case, the power line is a "default" option.

A portable device, for example, a video camera/recorder may be connected to the power line when it is charged in a battery charger (cradle). In FIG. 3, Video Camera/Recorder 204 has a wireless interface and communicates with Client 202 over the wireless network. Its IP address is IP204W. Battery Charger 205 has a power line interface with IP address IP205P. When Video Camera/Recorder 204 is placed on Battery Charger 205 as shown in FIG. 4, both device's exchange their own IP address and send Client 202 a notice that they got combined to one device and the two IP addresses IP204W and IP205P indicate the same device. Client 202 starts communication with this combined device using either or both of the two networks as Client 202 communicates with Server 201.

If Battery Charger 205 has both a power line and a wireless interface and it works as an access point, the transmitter (Video Camera/Recorder 204) may select a shorter, direct path, as shown in FIG. 5. Assume that Video Camera/Recorder 204 is too far from Client 202 to communicate over the wireless. When Video Camera/Recorder 204 and Client 202 communicate, Battery Charger 205 is in between and works as a bridge. Batter Charger 205 receives data air-transmitted from Video Camera/Recorder 204 and forwards to Client 202 and vice versa. A communication path between Battery Charger 205 and Client 202 are either the power line or the wireless. (Battery Charger 205 has two IP addresses: IP205W and IP205P.) Once Video Camera/Recorder 204 gets close to Client 202 and a wireless communication is established between both devices, they stop the current transmission via Battery Charger 205 and start direct transmission. When one path is direct and the other path is not, Client 202 selects the direct path. If wireless network condition between Video Camera/Recorder 204 and Client 202 gets worse, Client 202 may switch to the original indirect path. Path selection is dynamically and adaptively performed. When Video Camera/Recorder 204 is placed on Battery Charger 205, both are combined to one device and it has three IP addresses: IP204 W, IP205W and IP205P. Client 202 may select any of them to communicate with Video Camera/Recorder 204.

When both networks are available, a transmitter can perform high-speed transmission using both network paths. The transmitter allocates transmission data to the power line and the wireless based on their available bandwidth. For example, their bandwidth ratio is 2:1, the first 10K bytes are sent through the power line and the next 5 k bytes are sent over the wireless. This ratio could change every moment. All data is packetized before transmission. The packet length is fixed or variable.

Both network transmissions may not be not synchronized with each other. The receiver has to reorder received packets. To solve this issue, the transmitter gives each packet an incremental sequence number. Based on this number, the receiver performs packet reordering. If TCP protocol is used, the 32-bit sequence number in TCP header may be used for reordering.

Assume that Server 201 transmits data stored in HDD 2 to Client 202. CPU 4 controls DMA (Direct Memory Access) so that data read from HDD 2 goes to either PLC I/F 9 or Wireless IF 21. If necessary, CPU 4 attaches a packet header at the top of each packet. PLC I/F 112 and Wireless I/F 125 in Client 202 receive the data from Server 201. Received data is stored in Memory 122 or Memory 114. CPU 106 reorders packets in the memory based on the sequence number. If the data is an audio/video stream, it is sent to Decoder 115 for decoding.

Figure 6:
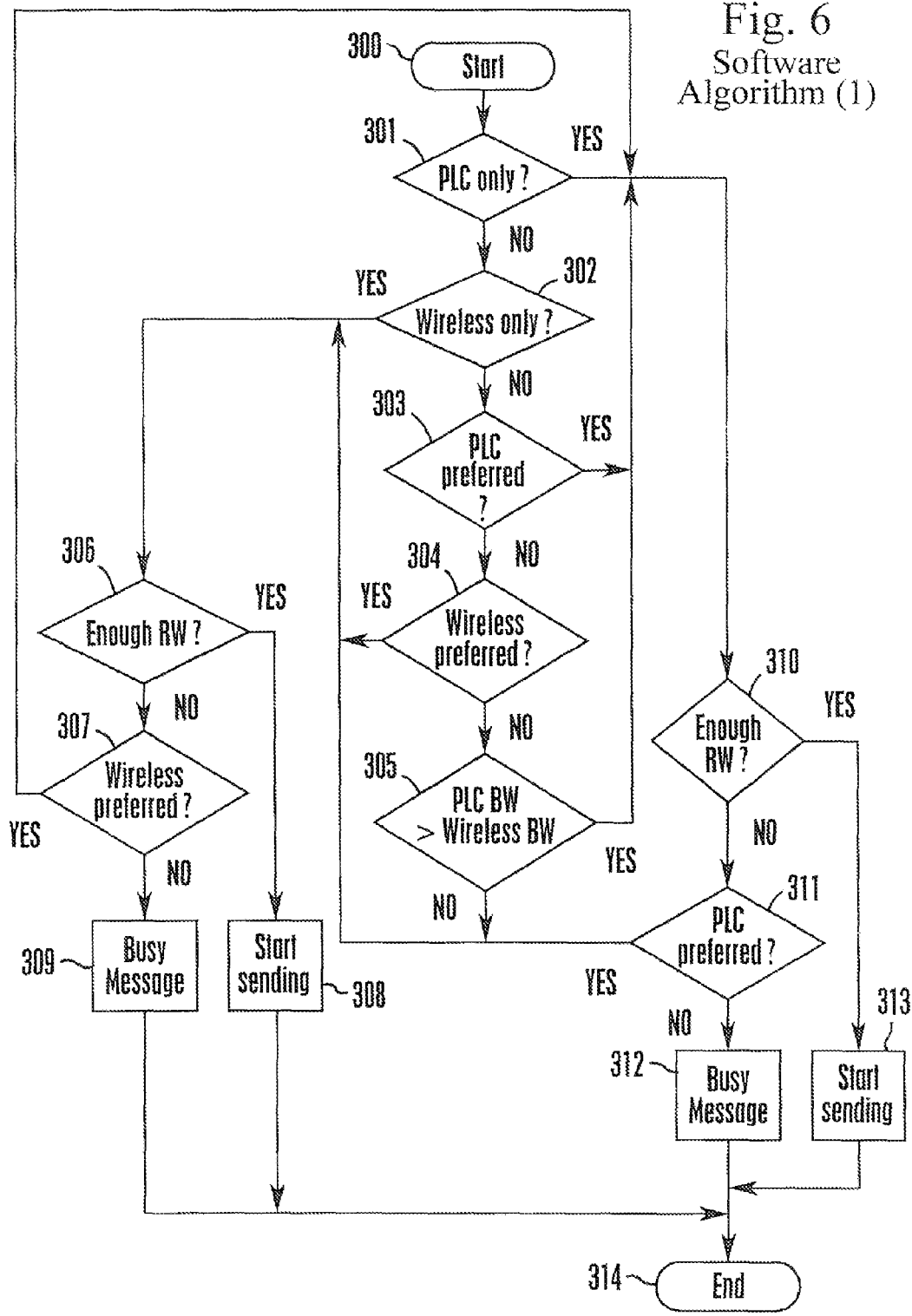
FIGS. 6 and 7 are flow charts of logic for determining which link, wired or wireless to use to communicate with a component having both capabilities.

Now referring to FIG. 6, commencing at state 300, the logic move to decision diamond 301 to determine whether the particular component sought to be communicated with has wired (e.g., PLC) communication capability only. If not, the logic proceeds to decision diamond 302, to determine whether the particular component sought to be communicated with has wireless communication capability only.

If the results of the tests at decision diamonds 301 and 302 indicate that the component has both capabilities, the logic flows to decision diamond 303 to determine whether wired communication is preferred, as indicated by the client. If it is not, the logic flows to decision diamond 304 to determine whether wireless communication is preferred, as indicated by the client. If it is not, the logic continues to decision diamond 305 to determine whether the client's (or network's) wired bandwidth is greater than its wireless bandwidth.

When the wired bandwidth is not greater than the wireless bandwidth of the client (or when the client has only wireless communication at decision diamond 302, or has both capabilities but prefers wireless communication at decision diamond 304), the logic flows to decision diamond 306 to determine whether the wireless bandwidth of the client is sufficient for the data sought to be sent. If it is not, the logic moves to decision diamond 307 to determine whether the client prefers wireless, and if so the logic continues to decision diamond 310, to be discussed momentarily.

In contrast, if, at decision diamond 306 it is determined that the wireless bandwidth is sufficient for the data sought to be sent, the logic moves to block 308 to send the data over the wireless link. On the other hand, if, at decision diamond 307 it is determined that the client does not prefer wireless, a busy message is returned at block 309, alerting the client to perhaps, e.g., change its preference.

As mentioned above, when the client prefers wireless at decision diamond 307, or from positive tests at either one of decision diamonds 301, 303, and 305, the logic moves to decision diamond 310. At decision diamond 310, it is determined whether the wired link has sufficient bandwidth to send the data sought to be sent. If not, it is determined at decision diamond 311 whether wired transmission is preferred, and if so the logic loops back to decision diamond 306; otherwise, a busy message is returned at block 312 in accordance with principles above. However, if it is determined at decision diamond 310 that sufficient wired bandwidth exists, the data is sent at block 313. The logic ends at state 314.

Figure 7:
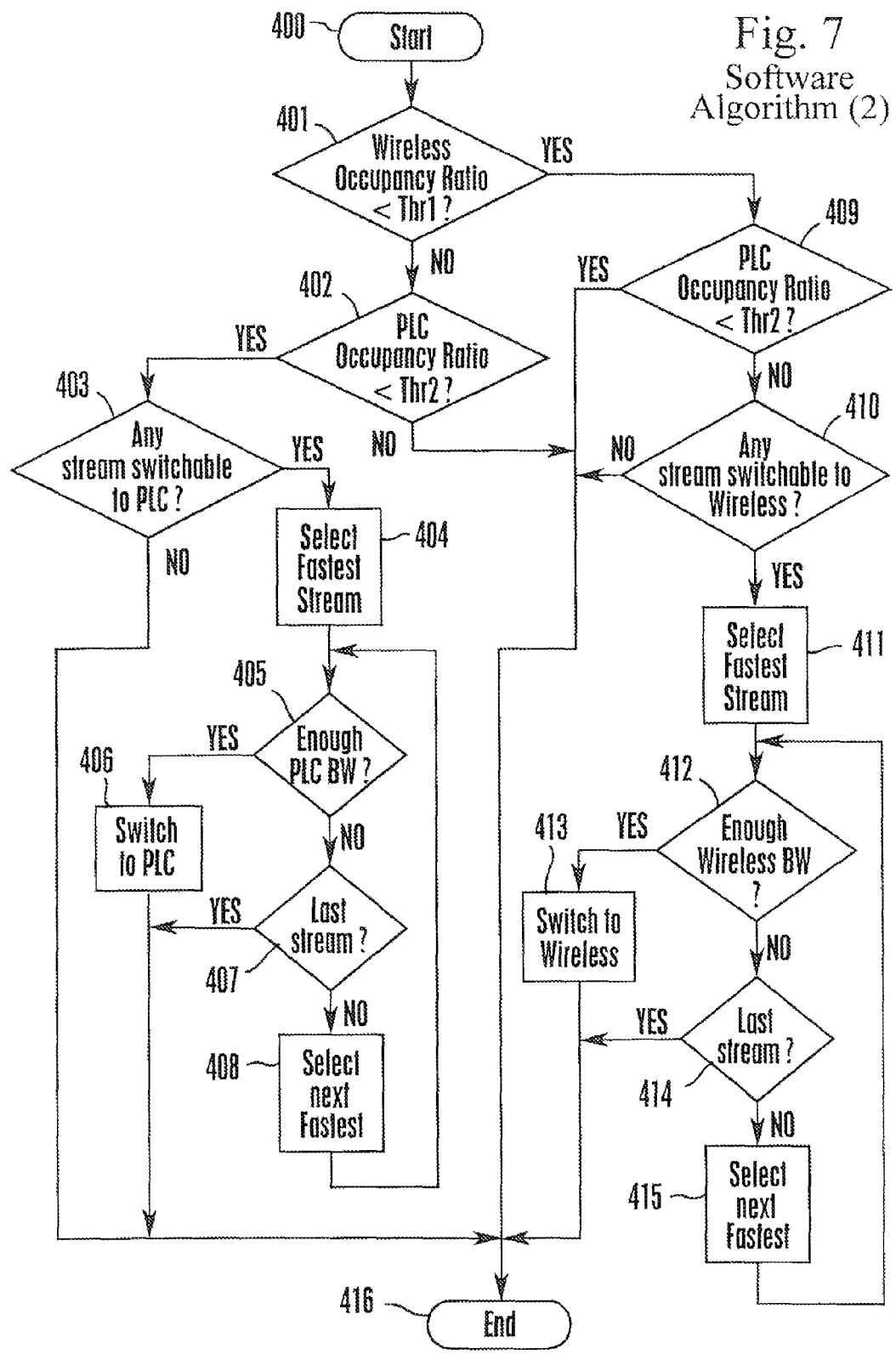

FIG. 7 shows alternative logic that can be invoked for adaptive network path control, recognizing that various noise and interference affects network transmission such that network bandwidth can change and the fact that a transmission often starts and stops. Even if all transmissions are efficiently assigned to both networks, network bandwidth rarely stays constant, such that the present invention recognizes that it is sometimes desirable that the transmitter switch links.

Accordingly, commencing at state 400, the logic flow to decision diamond 401, wherein it is determined whether the wireless bandwidth occupancy ratio (%) is less than a threshold "1". The wireless bandwidth occupancy ratio is obtained by dividing currently used bandwidth by the total available bandwidth of the transmitter. Threshold "1" may be, for example, 80%. If the ratio is more than Threshold "1" the logic flows to decision diamond 402 to determine whether the wired network bandwidth occupancy ratio is less than a second threshold "2", which may be obtained by dividing currently used bandwidth by the total available bandwidth of the transmitter. Threshold "2" can be, for example, 80%.

If the wired network occupancy ratio is less than threshold "2", the logic proceeds to decision diamond 403 to determine whether there is an on-going transmission that can be switched to the wireless link. If so, the fastest transmission is selected at block 404 from all the switchable transmissions. By "fastest" transmission is meant the transmission that is using the largest bandwidth.

Flowing from block 404 to decision diamond 405, it is determined whether enough wired network bandwidth exists, and if so, transmission is switched to the wired network at block 406. If insufficient wired link bandwidth exists at decision diamond 405, the logic moves to decision diamond 407 to determine whether the last stream has been tested, and if not, the next fastest stream yet to be tested is selected at block 408. The logic then loops back to decision diamond 405. The logic ends at state 416 after block 406, or after the last stream has been tested as determined at decision diamond 407, or after it is determined at decision diamond 402 that the wired network bandwidth occupancy ratio is equal to or more than the second threshold "2".

Recall that if it is determined at decision diamond 401 that the wireless bandwidth occupancy ratio (%) is less than a threshold "1", the logic flows to decision diamond 409, which essentially is the same test as described above for decision diamond 402. If it is determined at decision diamond 409 that the wired bandwidth occupancy ratio is less than the second threshold "2", the logic ends, but otherwise the logic proceeds to decision diamond 410 to determine whether there is an on-going transmission that can be switched to the wireless link. If so, the fastest transmission is selected at block 411 from all the switchable transmissions.

Flowing from block 411 to decision diamond 412, it is determined whether enough wired network bandwidth exists, and if so, transmission is switched to the wired network at block 413, after which the logic ends at state 416. If insufficient wired link bandwidth exists at decision diamond 412, the logic moves to decision diamond 414 to determine whether the last stream has been tested, and if not, the next fastest stream yet to be tested is selected at block 415. The logic then loops back to decision diamond 405. If the last stream was tested at decision diamond 414, the logic ends at state 416.

It is to be understood that the present system can be applied to IEEE 1394 networks, UWB networks, etc. The above principles can be extended to three or more networks, for example a combination of PLC, wireless and IEEE 1304 bus. Moreover, a network path may be selected based on other factors such as network jitter, latency, etc. For example, VoIP (Voice over IP) is very latency-sensitive, and a VoIP transmission primarily may select a latency-small network.

With the above in mind, it may be appreciated that the preferred embodiments of the present invention afford efficient network use by switching a transmission from a busy network to the other. Also, increased total bandwidth guarantees more error-robust transmission. Furthermore, the preferred invention affords adaptive, dynamic control that follows network traffic and condition. Also, high-speed transmission can be effected using both network paths simultaneously, and the network operation is completely transparent to a user. A transmission can be automatically switched between networks. And, PHY and MAC layers need no modification, since middle or upper layer software controls network operation. No additional hardware beyond what is already conventionally provided need be required.

While the particular SYSTEM AND METHOD FOR MULTI-LINK COMMUNICATION IN HOME NETWORK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for".

I claim:

1. A home entertainment system, comprising:
at least one server configured for both wired and wireless communication; and
at least one component communicating with the server, a wireless path between the server and component being available for communication between the server and the component, a wired path between the server and component being available for communication between the server and the component, the server and/or the component determining which path from among the wired path and the wireless path to use for communication based on at least one of: a bandwidth capability, an occupancy ratio.

2. The system of claim 1, wherein a respective address is associated with each path over which the component communicates.

3. The system of claim 2, wherein the addresses are IP addresses.

4. The system of claim 1, wherein the component is selected from the group of components consisting of: televisions, and portable computers.

5. The system of claim 4, wherein the component is a TV.

6. The system of claim 1, wherein at least one of: the server, and component, determines which path to use for communication based at least in part on a component preference.

7. The system of claim 1, wherein at least one of: the server, and component, determines which path to use for communication based at least in part on a bandwidth capability.

8. The system of claim 1, wherein at least one of: the server, and component, determines which path to use for communication based at least in part on an occupancy ratio.

9. A method for communicating a home network, comprising:
determining that both a wired path and a wireless path exist between two components;
responsive to a determination that at least one of the two components prefers a particular path, communicating data over that path;
determining that at least one of the two components does not prefer a particular path selected from the wired path and the wireless path; and
responsive to determining that at least one of the two components does not prefer a particular path selected from the wired path and the wireless path, communicating data between the two components over at least one of the paths between the two components based on at least one of: a bandwidth capability, an occupancy ratio.

10. The method of claim 9, comprising communicating simultaneously between the components using both paths.

11. The method of claim 9, wherein a respective address is associated with each path over which the component communicates.

12. The method of claim 11, wherein the addresses are IP addresses.

13. The method of claim 9, wherein at least one component is selected from the group of components consisting of: televisions, and portable computers.

14. The method of claim 13, wherein the component is a TV.

15. The method of claim 9, wherein at least one of a server, and a component, determines which path to use for communication based at least in part on a component preference.

16. The method of claim 9, wherein at least one of a server, and a component, determines which path to use for communication based at least in part on a bandwidth capability.

17. The method of claim 9, wherein at least one of: a server, and a component, determines which path to use for communication based at least in part on an occupancy ratio.

18. A system for communicating between at least first and second components in a home network, comprising:
a first processor in the first component and a second processor in the second component, the first processor causing the first component to communicate data over a component-preferred path when a component-preferred path is indicated, the component-preferred path being selected from a wired and wireless communication paths over both of which the components communicate with each other;
the first processor, when no component-preferred path is indicated, communicating data to the second processor over at least one of the paths based on at least one of: a bandwidth capability, an occupancy ratio.

19. The system of claim 18, wherein a respective address is associated with each path.

20. The system of claim 19, wherein the addresses are IP addresses.

21. The system of claim 18, wherein at least one component is selected from the group of components consisting of: televisions, and portable computers.

22. The system of claim 21, wherein the component is a TV.

23. The system of claim 18, wherein at least one of: a server, a component, determines which path to use for communication based at least in part on a component preference.

24. The system of claim 18, wherein at least one of: a server, a component, determines which path to use for communication based at least in part on a bandwidth capability.

25. The system of claim 18, wherein at least one of: a server, a component, determines which path to use for communication based at least in part on an occupancy ratio.

* * * * *